US010712150B2

(12) United States Patent
Ziegler et al.

(10) Patent No.: US 10,712,150 B2
(45) Date of Patent: Jul. 14, 2020

(54) DISPLACEMENT DETERMINATION USING OPTICAL MEASUREMENTS

(71) Applicant: Rolls-Royce Corporation, Indianapolis, IN (US)

(72) Inventors: Scott Ziegler, Grand Ledge, MI (US); Scott Courtney, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 71 days.

(21) Appl. No.: 16/180,584

(22) Filed: Nov. 5, 2018

(65) Prior Publication Data

US 2019/0145761 A1    May 16, 2019

Related U.S. Application Data

(60) Provisional application No. 62/584,307, filed on Nov. 10, 2017.

(51) Int. Cl.
| | |
|---|---|
| *G01B 11/26* | (2006.01) |
| *G01B 11/14* | (2006.01) |
| *F01D 21/00* | (2006.01) |
| *G01H 1/00* | (2006.01) |

(52) U.S. Cl.
CPC .......... *G01B 11/26* (2013.01); *F01D 21/003* (2013.01); *G01B 11/14* (2013.01); *G01H 1/006* (2013.01); *F05D 2260/83* (2013.01)

(58) Field of Classification Search
CPC ....... G01B 11/26; G01B 11/272; G01B 11/27; G01C 15/004; G01C 15/002
USPC .......................................................... 356/138
See application file for complete search history.

(56) References Cited

U.S. PATENT DOCUMENTS

| | | |
|---|---|---|
| 8,380,450 B2 | 2/2013 | Loftus |
| 9,016,132 B2 | 4/2015 | Russhard et al. |
| 9,341,511 B2 | 5/2016 | Russhard et al. |
| 9,494,491 B2 | 11/2016 | Jousselin |
| 9,593,592 B2 | 3/2017 | Jousselin |
| 2002/0122163 A1* | 9/2002 | Inoue ..................... G03B 27/52 355/55 |

(Continued)

OTHER PUBLICATIONS

Carrington et al., "A comparison of blade tip timing data analysis methods", Jun. 2001, 12 pgs.

(Continued)

*Primary Examiner* — Md M Rahman
(74) *Attorney, Agent, or Firm* — Shumaker & Sieffert, P.A.

(57) ABSTRACT

The disclosure includes a system that includes a light source, an optical detector, a camera, and a controller. The light source is configured to illuminate a turbine blade of an engine. The optical detector is coupled to a turbine case of the engine. The camera is communicatively coupled to the optical detector and configured to detect an image of the turbine blade at a stationary condition and an image of the turbine blade at a rotational speed and temperature using the optical detector. The controller is configured to determine and output a relative displacement of at least one timing probe from the turbine blade at the rotational speed and temperature based on the image of the turbine blade at the stationary condition and the image of the turbine blade at the rotational speed and temperature. The at least one timing probe is coupled to the turbine case.

20 Claims, 10 Drawing Sheets

(56) References Cited

U.S. PATENT DOCUMENTS

| | | | |
|---|---|---|---|
| 2003/0093187 A1* | 5/2003 | Walker | B64C 13/20 |
| | | | 701/1 |
| 2004/0016930 A1* | 1/2004 | Yoshida | H01L 22/32 |
| | | | 257/79 |
| 2005/0007257 A1* | 1/2005 | Rast | B64D 47/04 |
| | | | 340/815.45 |
| 2010/0073687 A1* | 3/2010 | Spalding | G01B 11/2425 |
| | | | 356/625 |
| 2011/0069165 A1 | 3/2011 | Zombo et al. | |
| 2012/0227389 A1* | 9/2012 | Hinderks | F01L 13/0042 |
| | | | 60/317 |
| 2013/0038470 A1* | 2/2013 | Niemeyer | H04Q 9/00 |
| | | | 340/870.11 |
| 2013/0115050 A1 | 5/2013 | Twerdochlib | |
| 2013/0226518 A1 | 8/2013 | Jousselin | |
| 2013/0319071 A1* | 12/2013 | Vodnick | G01N 3/02 |
| | | | 73/1.08 |
| 2014/0094093 A1* | 4/2014 | Miller | B24C 7/0023 |
| | | | 451/39 |
| 2015/0018622 A1* | 1/2015 | Tesar | A61B 1/05 |
| | | | 600/202 |
| 2015/0199805 A1 | 7/2015 | Hatcher, Jr. et al. | |

OTHER PUBLICATIONS

Russhard, Blade Tip Timing—Frequently asked Questions, Rolls-Rolls plc, Jun. 2012, 27 pgs.

Rossi et al., "Design of blade tip timing measurement systems based on uncertainty analysis", 2012, 19 pgs., Applicant points out, in accordance with MPEP 609.04(a), that the year of publication, 2012, is sufficiently earlier than the effective U.S. filing date, 2018, so that the particular month of publication is not in issue.

Zhang et al., "A Blade Tip Timing Method Based on a Microwave Sensor", May 11, 2017, www.mdpi.com/journal/sensors, 11 pgs.

Pan et al., "Sparse Representation Based Frequency Detection and Uncertainty Reduction in Blade Tip Timing Measurement for Multi-Mode Blade Vibration Monitoring", Jul. 30, 2017, www.mdpi.com/journal/sensors, 19 pgs.

Russhard, "Analysis of Rotating Stall in a Contra-Rotating System using Blade Tip Timing", Rolls-Royce plc, Jun. 2012, 33 pgs.

Gallego-Garrido, "A Class of Methods for the Analysis of Blade Tip Timing Data from Bladed Assemblies Undergoing Simultaneous Resonances—Part 1: Theoretical Development", Jan. 2007, International Journal of Rotating Machinery, vol. 2007, 12 pgs.

Gallego-Garrido, "A Class of Methods for the Analysis of Blade Tip Timing Data from Bladed Assemblies Undergoing Simultaneous Resonances—Part II: Experimental Validation", Jan. 2007, International Journal of Rotating Machinery, vol. 2007, 10 pgs.

Russhard, "The Rise and Fall of the Rotor Blade Strain Gauge", Sep. 2014, Vibration Engineering and Technology Machinery Proceedings of Vetomac, 12 pgs.

Response to the Extended Search Report from counterpart European Application No. 18199938.4, dated May 20, 2019, filed Aug. 19, 2019, 65 pp.

Extended Search Report from counterpart European Application No. 18199938.4, dated Mar. 28, 2019, 5 pp.

* cited by examiner

| Mode Crossing | Displacement-to-Stress Ratio (inch / KSI) | | |
|---|---|---|---|
| | Nominal | -0.050" | +0.050" |
| Mode 7 / 28 EO | 4.35E-03 | 2.15E-03 | 6.76E-03 |

DISPLACEMENT DETERMINATION USING OPTICAL MEASUREMENTS

This application claims the benefit of U.S. Provisional Application No. 62/584,307, filed Nov. 10, 2017, which is incorporated herein by reference in its entirety.

TECHNICAL FIELD

The disclosure relates to methods and systems for determining a mechanical stress of a turbine blade.

BACKGROUND

During operation of a turbine, rotating blades of the turbine may vibrate at frequencies that coincide with harmonics of the assembly rotation frequency and are caused by mechanical excitation (synchronous vibration) and frequencies that do not coincide with harmonics and are caused by aeroelastic excitation (asynchronous vibration). As blades vibrate, mechanical stresses are exerted on the blades. These mechanical stresses may be reduced by quantifying blade vibration and establishing limits to protect equipment from excessive mechanical stresses. For example, during design of a turbine, blade simulations may predict a blade deflection and stress distribution associated with the resonant frequencies of the turbine blades.

SUMMARY

In some examples, the disclosure describes a method that includes illuminating at least a portion of a turbine blade of an engine using a light source. The method further includes detecting, by a camera, an image of the at least a portion of the turbine blade at a stationary condition and an image of the at least a portion of the turbine blade at a rotational speed and temperature using an optical detector. The optical detector is coupled to a turbine case of the engine. The method further includes determining, by a controller, a relative displacement of at least one timing probe from the at least a portion of the turbine blade at the rotational speed and temperature based on the image of the at least a portion of the turbine blade at the stationary condition and the image of the at least a portion of the turbine blade at the rotational speed and temperature. The at least one timing probe is coupled to the turbine case. The method further includes outputting, by the controller, the relative displacement of the at least one timing probe from the at least a portion of the turbine blade at the rotational speed and temperature.

In other examples, the disclosure describes a system that includes a light source, an optical detector, a camera, and a controller. The light source is configured to illuminate at least a portion of a turbine blade of an engine. The optical detector is coupled to a turbine case of the engine. The camera is communicatively coupled to the optical detector and configured to detect an image of the at least a portion of the turbine blade at a stationary condition and an image of the at least a portion of the turbine blade at a rotational speed and temperature using the optical detector. The controller is configured to determine and output a relative displacement of at least one timing probe from the at least a portion of the turbine blade at the rotational speed and temperature based on the image of the at least a portion of the turbine blade at the stationary condition and the image of the at least a portion of the turbine blade at the rotational speed and temperature. The at least one timing probe is coupled to the turbine case.

In other examples, the disclosure describes a controller configured to output an illumination signal to a light source to cause the light source to illuminate a portion of a turbine blade of an engine. The controller is further configured to output an exposure signal to a camera to cause the camera to detect an image of the portion of the turbine blade at a stationary condition and an image of the portion of the turbine blade at a rotational speed and temperature using an optical detector. The optical detector is coupled to a turbine case. The controller may be further configured to receive an image signal from the camera that includes the image of the portion of the turbine blade at the stationary condition and the image of the portion of the turbine blade at the rotational speed and temperature. The controller may be further configured to determine and output a relative displacement of the at least one timing probe from the at least a portion of the turbine blade at the rotational speed and temperature based on the image of the at least a portion of the turbine blade at the stationary condition and the image of the at least a portion of the turbine blade at the rotational speed and temperature.

The details of one or more examples are set forth in the accompanying drawings and the description below. Other features, objects, and advantages of the disclosure will be apparent from the description and drawings, and from the claims.

DETAILED DESCRIPTION

Figure 1:
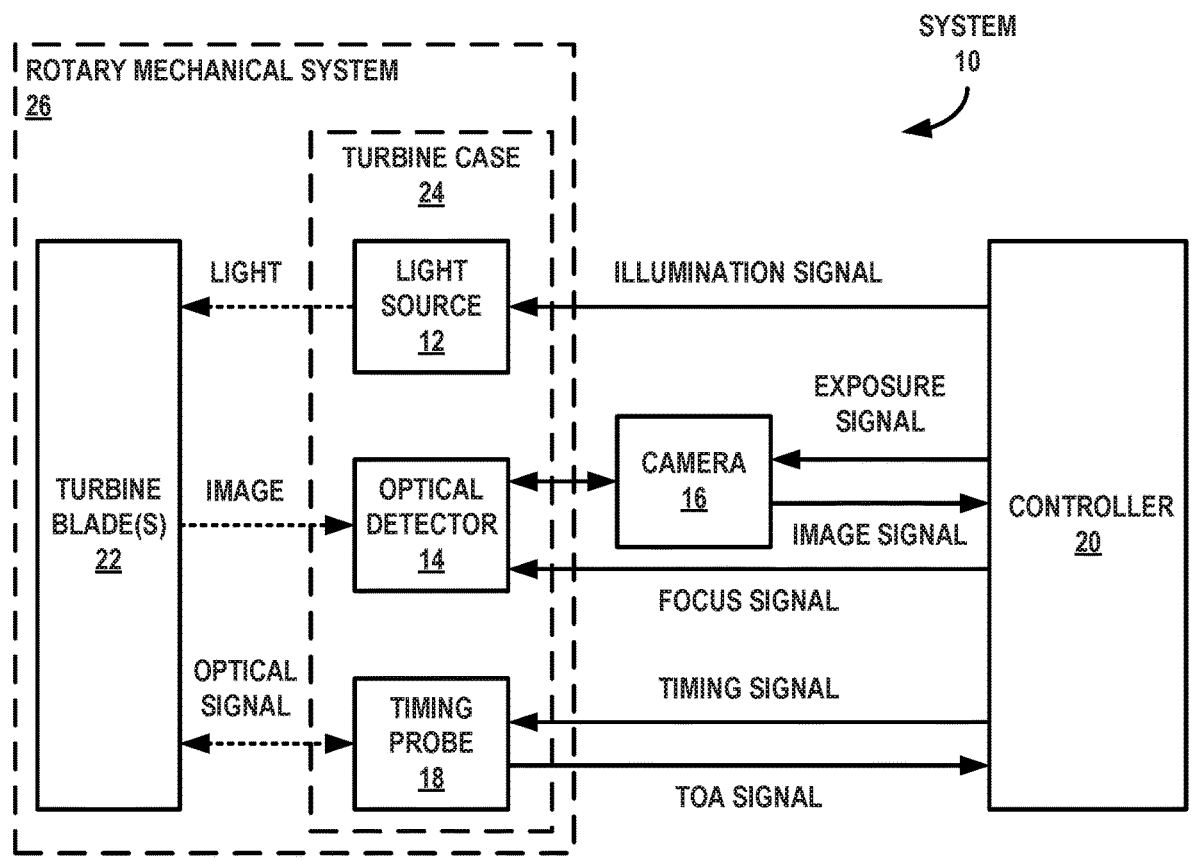
FIG. 1 is a conceptual and schematic block diagram illustrating an example system for determining a relative displacement between one or more timing probes and a portion of a turbine blade using optical measurements.

The disclosure describes systems and techniques to determine a relative displacement between one or more timing probes and a portion of a rotating turbine blade using optical measurements. The relative displacement between one or more timing probes and the portion of the rotating turbine blade may be used to more accurately determine mechanical stresses on the rotating turbine blade.

According to principles of the disclosure, blade tip timing (BTT) may use optical displacement information to determine a relative displacement between turbine blades and turbine blade tip timing instrumentation at various operating conditions. BTT systems may include a set of timing probes positioned circumferentially around a rotor in a turbine case. The timing probes may be configured to measure time-of-arrival of rotating turbine blades at an axial measurement location of a tip for each turbine blade. The time-of-arrival of each turbine blade at the axial measurement location may be compared to a non-vibrating reference and used to determine deflections of individual turbine blades. The deflections may be tracked over time and at various operating conditions to determine blade vibration information. A finite element (FE) model of the turbine blade may be used to relate the deflections at the axial measurement location to a mechanical stress for each turbine blade. The determination of mechanical stress from deflection measurements may be specific to the axial measurement location of the deflection measurement due to various vibration modes of the turbine blade such that, for a particular mechanical stress, a first axial measurement location may indicate a different deflection than a second axial measurement location.

During turbine operation, the turbine case, which includes the timing probes, and the turbine blades may displace relative to each other in an axial direction due to thermal growth and movement of the rotor shaft on the bearings of the rotor shaft. This axial displacement may cause the timing probes to measure time-of-arrival, and corresponding deflections, of the rotating turbine blades at a different axial measurement location on the tip of each turbine blade than at other rotational speeds and temperatures. Deflections at different axial measurement locations may be associated with different mechanical stresses for different modes of vibration, such that a difference in timing measurement location on the turbine blade, if left unadjusted, may lead to inaccuracies in the conversion of deflections to mechanical stress, resulting in inaccurate mechanical stress profiles of the turbine blades.

A system described herein may use optical measurements to determine a relative displacement between a timing probe, such as a timing probe discussed above, and the turbine blades. In some examples, the system includes a light source, an optical detector, a camera, at least one timing probe, and a controller. The optical detector and the timing probe(s) may be coupled to the same stationary component (i.e., non-rotating) of the turbine, such as a turbine case, such that displacement of the stationary component from the turbine blades may displace the optical detector and the timing probe(s). The light source may illuminate a portion of a turbine blade, such as a tip of the turbine blade. The camera may use the optical detector to detect images of the portion of the turbine blade at stationary conditions and at dynamic conditions for various rotational speeds and temperatures. As the turbine blade rotates at the various rotational speeds and temperatures, the turbine blade may become displaced from the stationary component and, correspondingly, the optical detector and the timing probe(s) coupled to the stationary component. The controller may determine relative displacement information of the optical detector from the turbine blade based on an image of the portion of the turbine blade at a stationary condition and an image of the portion of the turbine blade at a rotational speed and temperature. The controller may use the optical information to determine the relative displacement of the timing probe(s) from the turbine blade at the rotational speed and temperature.

The controller may use the relative displacement of the timing probe from the turbine blade to adjust the timing measurement location for which a particular deflection measurement is associated. The controller may determine a mechanical stress of the turbine blade at the rotational speed and temperature based on the adjusted timing measurement location. By using optical measurements to determine the relative displacement between timing probes and the turbine blades at various operating conditions, the system may increase accuracy of mechanical stress calculations.

Additionally or alternatively, optical measurements may provide the system with other information for validating finite element models used to determine mechanical stresses of turbine blades. The light source may be a pulsating light source synchronized to the rotational speed and temperature, such that the images of the portion of the turbine blade may be approximate still images and the displacement information may include alignment information of turbine blades at various rotational speeds and temperatures. In addition to predicting mechanical stress, the finite element models may predict an orientation of the turbine blades at various operating conditions. The system may use the alignment information to validate the finite element model used to determine mechanical stresses or for more comprehensive calculations, such as blade twist, blade lean angle, and dynamic vibration response.

FIG. 1 is a conceptual and schematic block diagram illustrating an example system 10 for determining a relative displacement of one or more timing probes from a portion of a turbine blade 22 of a rotary mechanical system (RMS) 26 using optical measurements. System 10 includes a light source 12, an optical detector 14, a camera 16, at least one timing probe 18, and a controller 20. While FIG. 1 is described with reference to a turbine blade of a rotary mechanical system, the principles discussed in the present disclosure may be used for mechanical analysis of any blade of a rotary or cyclic mechanical system that has vibrations during operation. For example, turbine blade 22 and RMS 26 may be replaced with a fan blade and fan rig, respectively.

RMS 26 may be any rotary mechanical system including, but not limited to, gas turbine engines such as turboprop, turbofan, turboshaft, and turbojet; steam turbines; water turbines; and the like. In examples in which RMS 26 includes a gas turbine engine, RMS 26 may include a plurality of turbine blades 22 circumferentially bordered by a turbine case 24 (see, for example, turbine blades 58 and turbine case 52 of FIG. 3). Turbine blades may include any blade within a turbine or turbomachine. For example, in gas turbine engines, turbine blade may include a blade within the compressor cold section (low, intermediate, or high pressure compressor blades) or within the turbine hot section (low or high pressure turbine blades).

Turbine case 24 may include a plurality of holes configured to encase or provide a line-of-sight for instrumentation of system 10, such as light source 12, optical detector 14, and timing probe 18. The plurality of holes may have any size and configuration suitable for housing the instrumentation of system 10. In some examples, the plurality of holes may be sized such that the plurality of holes may not significantly affect gas flow of RMS 26 and/or structural integrity of turbine case 52 while allowing for a suitable field-of-view for the instrumentation of system 10. For example, turbine casing 24 may include holes on an order of magnitude of typical holes for engine instrumentation, such as 0.333 inch holes for timing probe 18. The holes may be located and oriented to allow line-of-sight between optical detector 14 and plurality of turbine blades 22, between timing probe 18 and plurality of turbine blades 22, between light source 12 and plurality of turbine blades 22, or the like.

System 10 includes light source 12. Light source 12 may be configured to illuminate at least a portion of a turbine blade of the plurality of turbine blades 22. The at least a portion of the turbine blade may include any portion of the turbine blade that may be monitored under various operating conditions to provide an indication of time-of-arrival or position, such as displacement, tilt, and twist, of the turbine blade under the various operating conditions. In some examples, the at least a portion of the turbine blade includes a radially outward tip of a leading or trailing edge of the turbine blade.

In some examples, light source 12 may be coupled to turbine case 24. For example, light source 12 may be positioned in a bore hole in turbine case 24. Light source 12 may be positioned to directly illuminate the at least a portion of the turbine blade. For example, light source 12 may be positioned at or near optical detector 14, such that the field of illumination of light source 12 may be substantially similar to a field of view of optical detector 14. A variety of light sources may be used for light source 12 including, but not limited to, LEDs, lasers, and the like. Factors that may be used to select a light source include, but are not limited to, temperature rating, strobe/pulse speed, and other factors related to turbine and turbine blade conditions. In some examples, light source 12 may be a laser system, such that light source 12 may be pulsed at a speed that is substantially equal to or faster than a rotational speed of the turbine blade and an intensity that is adequate to illuminate the at least a portion of the turbine blade at the abbreviated pulsating period.

In some examples, light source 12 may be communicatively coupled to controller 20 and configured to receive illumination signals from controller 20. The illumination signals may be configured to control light source 12 to emit light having particular characteristics including, but not limited to, light intensity, light spatial pattern, light timing pattern, light wavelength or range of wavelengths, light direction, light duration, and the like. For example, light source 20 may include circuitry that is configured to control a light to emit a light intensity or pattern in response to the illumination signal from controller 20.

In some examples, light source 12 may be configured to emit a strobing or pulsating light in response to the illumination signals from controller 20. For example, camera 16 may not be configured to capture a still image of the at least a portion of the turbine blade at higher rotational speeds due to limited exposure speeds of camera 16. Light source 12 may be configured to compensate for the limited exposure speeds by strobing at a particular rate, such that the at least a portion of the turbine blade that is illuminated for a brief period of time approximating a still image. Light source 12 may be configured to strobe, pulse, or gate light at a rate indicated by the illumination signal. In some examples, light source 12 may be configured to synchronize with a rotational speed signal, such as a once-per-revolution period of a rotational speed, of the turbine rotor. For example, light source 12 may be configured to receive an illumination signal to strobe at a rate that is at least as fast as a rotational speed of the turbine blade. In some examples, the illumination signal may cause light source 12 to strobe multiple times per rotation, such that more than one turbine blade of the plurality of turbine blades 22 may be tracked at a time.

System 10 includes optical detector 14. Optical detector 14 may be configured to receive light from the at least a portion of the turbine blade corresponding to an image of the at least a portion of the turbine blade and transmit the light to camera 16. A variety of optical detectors may be used for optical detector 14 including, but not limited to, optical scopes, fiberscopes, borescopes, and other optical lenses configured to optically relay light to a camera. Factors that may be used to select optical detector 14 include, but are not limited to, temperature rating, resolution, focusing system, and the like.

Optical detector 14 may be physically coupled to turbine case 24. For example, optical detector 14 may be positioned in a bore hole in turbine case 24 near light source 12. Optical detector 14 may be positioned at a location in turbine casing 24 based on a number of factors including, but not limited to, ambient conditions, viewing distance, line-of-sight, interference, and the like. In some examples, optical detector 14 may be positioned at an axial position in turbine case 24 at a location that reduces or prevents thermal damage to optical detector 14. For example, if optical detector is rated for less than 300° F., optical detector 14 may be positioned in a part of turbine casing 24 that is designed to operate below 300° F., such as a portion of turbine casing 24 corresponding to a first stage of a compressor of RMS 26. Optical detector 14 may be positioned to directly receive the light from the at least a portion of the turbine blade. For example, optical detector 14 may be within a line-of-sight of the at least a portion of the turbine blade as the turbine blade passes near optical detector 14.

In some examples, optical detector 14 may be positioned to minimize interference, including aerodynamic effects, within turbine casing 24. For example, optical detector 14 may be positioned in a bore hole that is countersunk and facing an aft position, such that aerodynamic interference from optical detector 14 is reduced. In some examples, optical detector 14 may be positioned based on optical characteristics of the image and/or optical operation requirements of optical detector 14. For example, optical detector 14 may be positioned at an increased stand-off distance for a broader field of view, a decreased stand-off distance for a higher spatial resolution, and/or at least a minimum stand-off corresponding to a minimum focal length of optical detector 14. In some examples, optical detector 14 may be positioned at a same axial location as the at least one timing probe 18, while in other examples, optical detector 14 may be positioned at a different axial location as the at least one timing probe 18. For example, optical detector 14 may be positioned at a leading or trailing edge of the turbine blade to allow for visual differentiation of an axial position of the portion of the turbine blade, while the at least one timing probe may be positioned at any point on the turbine blade. In some example, the portion of the turbine blade may include gradations indicative of an axial position of optical detector 14, such that optical detector 14 may be positioned at any portion of the tip of the turbine blade.

Optical detector 14 may be optically coupled to camera 16, such that light received by optical detector 14 may be transmitted to and received by camera 16. For example, optical detector 14 may have an optical scope on an end that is coupled to turbine case 24 and an optical cable on an end that is configured to couple to camera 16, such that camera 16 may receive light received by optical detector 14. In some examples, an end of optical detector 14 near turbine case 24 may be spaced from camera 16, such that camera 16 is in a separate environment, such as at a different temperature, than optical detector 14.

In some examples, optical detector 14 may be a borescope. The borescope may be configured to resist higher temperatures than camera 16, which may include electronics sensitive to heat. For example, the borescope may be rated for temperatures above 200° F., while camera 16 may only be rated for temperatures above 100° F. The borescope may be coupled to turbine case 24, while camera 16 may be located a distance from an inner surface of turbine case 24, such as in an insulated compartment adjacent to a surface of turbine case 24.

Optical detector 14 may be communicatively coupled to camera 16 and/or controller 20. In some examples, optical detector 14 may include a focusing system configured to focus optical detector 14 on the at least a portion of the turbine blade, such as through focusing one or more lenses or moving an orientation of optical detector 14. The focusing system may include, for example, one or more lenses, actuators, or any other equipment that may change the focus of optical detector 14 from a first portion of the turbine blade to a second portion of the turbine blade. Optical detector 14 may be configured to receive focus or movement signals from camera 16 and/or controller 20. For example, optical detector 14 may receive a focus signal from controller 20, as illustrated in the example of FIG. 1, to cause optical detector 14 to focus on the at least a portion of the turbine blade.

System 10 includes camera 16. Camera 16 may be configured to detect an image of the at least a portion of the turbine blade at a variety of conditions, including stationary conditions and dynamic conditions, such as turbine operation having a rotational speed and temperature. Camera 16 may be optically coupled to optical detector 14 and configured to receive light from optical detector 14. Camera 16 may include any device capable of capturing an image from optical detector 14. A variety of cameras may be used including, but not limited to, digital cameras, and the like. Factors that may be used to select camera 16 include, but are not limited to, temperature rating, shutter speed/exposure time, frame rate, sensitivity, gain control, image resolution, and the other factors related to a turbine environment and image capture of a stationary or moving turbine blade.

Camera 16 may be configured to detect an image of the at least a portion of the turbine blade in a variety of operating conditions and at a variety of measurement conditions. Operating conditions may include, but are not limited to, rotational speed, temperature, thrust, compressor load, aerodynamic conditions, and the like. Measurement conditions may include, but are not limited to, optical measurement frequency, optical measurement tolerance, optical field-of-view, standoff distance, focus accuracy, and the like. In some examples, camera 16 may have a resolution that allows for an optical measurement of 0.001 inches of motion within the field of view of camera 16. For example, camera 16 may be selected such that the resolution of the camera and proximity to plurality of turbine blades 22 allow for an optical measurement tolerance of 0.001 inches. In some examples, camera 16 may have an exposure rate that allows for capture of an image of the at least a portion of the turbine blade at a speed of about 50,000 inches per second. For example, a 15-inch radius turbine blade rotating at 30,000 rpm may have a tip speed of about 50,000 inches per second. In some examples, camera 16 may have a frame rate of at least 100 frames per second. For example, an image of the at least a portion of the turbine blade operating at 30,000 rpm may be captured by camera 16 at an optical measurement frequency of every 5 revolutions.

In some examples, camera 16 may be communicatively coupled to controller 20. Camera 16 may be configured to receive exposure signals from controller 20 and send image signals to controller 20. For example, camera 16 may receive an exposure signal from controller 20 configured to cause camera 16 to capture an image at a particular time. Camera 16 may be configured to generate an image signal from the image and send the image signal to controller 20. For example, camera 16 may be configured to send an image signal representing the captured image to controller 20 corresponding to the particular time of image capture. In some examples, the exposure signal may synchronize camera 16 to a rotational speed of the turbine blade, such that camera 16 may capture an image of the at least a portion of the turbine blade as the at least a portion of the turbine blade passes in a line-of-sight of camera 16. For example, the exposure signal may correspond to a once-per-revolution signal, such that camera 16 may capture an image of the at least a portion of the turbine blade once-per-revolution of the turbine blade. As other examples, the exposure signal may correspond to a multiple times-per-revolution signal or a fractional times-per-revolution signal, such that camera 16 may capture an image of the at least a portion of the turbine blade multiple or fractional times-per-revolution of a specific turbine blade, or of multiple turbine blades.

While light source 12, optical detector 14, and camera 16 have been described as separate components, in some examples, two or more of light source 12, optical detector 14, and camera 16 may be combined into a single component having multiple functions of the combined components. For example, light source 12 and optical detector 14 may be components of a borescope that has lights integrated around a perimeter of an optical lens of the borescope. As another example, optical detector 14 and camera 16 may include a camera unit that includes an optical detector physically and optically coupled to the camera.

System 10 may include at least one timing probe 18. The at least one timing probe 18 may be coupled to turbine case 24 and configured to detect a time of arrival of the turbine blade. The at least one timing probe may be positioned such that a line of sight of the at least one timing probe intersects a tip of the turbine blade at a timing measurement location at an axial position. As explained above, the axial position of the timing measurement location may shift according to rotational speed and temperature. A variety of timing probes may be used including, but not limited to, optical sensors, capacitance sensors, eddy current sensors, and the like.

In some examples, the at least one timing probe 18 may include a plurality of timing probes 18 circumferentially disposed around turbine case 24. For example, as shown in the example turbine 50 of FIG. 4, eight timing probes 56 are evenly disposed around turbine case 52 to measure turbine blades 22 from a specific stage or multiple stages within the turbine 50. The plurality of timing probes may be distributed at a substantially same axial position in turbine case 24. The distribution of the plurality of timing probes may be selected such that time-of-arrival information from the plurality of timing probes may form a sinusoidal fit. In some examples, the plurality of timing probes 18 may be distributed in more than one plane. For example, RMS 26 may have at least one plane of a plurality of timing probes at each stage of RMS 26, such as a plane at one or both of a trailing edge and/or a leading edge of each stage.

The at least one timing probe 18 may be communicatively coupled to controller 20. The at least one timing probe 18 may be configured to send time-of-arrival (TOA) signals to controller 20 that indicate a time of arrival of the turbine blade. For example, the TOA signal may include step changes of an optical signal received from the turbine blade over a period of time, such that the leading or trailing edge of the step change may indicate a time of arrival of the turbine blade.

In some examples, the at least one timing probe 18 may include an optical sensor configured to emit an optical signal and receive a reflected optical signal from a turbine blade of plurality of turbine blades 22. The reflected optical signal from the turbine blade may represent a time of arrival of the turbine blade at the particular axial measurement location. For example, timing probe 18 may be a laser probe configured to emit a laser light toward the turbine blade and receive a reflected laser light from the turbine blade.

In some examples, at least a portion of any one of light source 12, optical detector 14, camera 16, and the at least one timing probe 18 may be coupled to a cooling system. For example, a portion of light source 12 and camera 16 may be located in a separate compartment that includes a cooling gas configured to cool the portion of light source 12 and camera 16. As another example, a liquid cooling system may contact a portion of any one of light source 12, optical detector 14, camera 16, and the at least one timing probe 18.

System 10 includes controller 20. Controller 20 may include any one or more of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. Controller 20 may also include one or more storage devices for storing images captured by camera 16 at various rotational speeds and temperatures, displacement information at various rotational speeds and temperatures, and the like.

Controller 20 may be communicatively coupled to and configured to control components of system 10. For example, controller 20 may be communicatively coupled to any one of light source 12, such as through sending illumination signals; optical detector 14, such as through sending focusing signals; camera 16, such as through sending exposure signals and receiving image signals; and the at least one timing probe 18, such as through sending timing signals and receiving TOA signals. In some examples, controller 20 may be communicatively coupled to systems outside system 10. For example, controller 20 may be communicatively coupled to a test system that stores relative displacement information for the plurality of turbine blades 22 of RMS 26.

Figure 2:
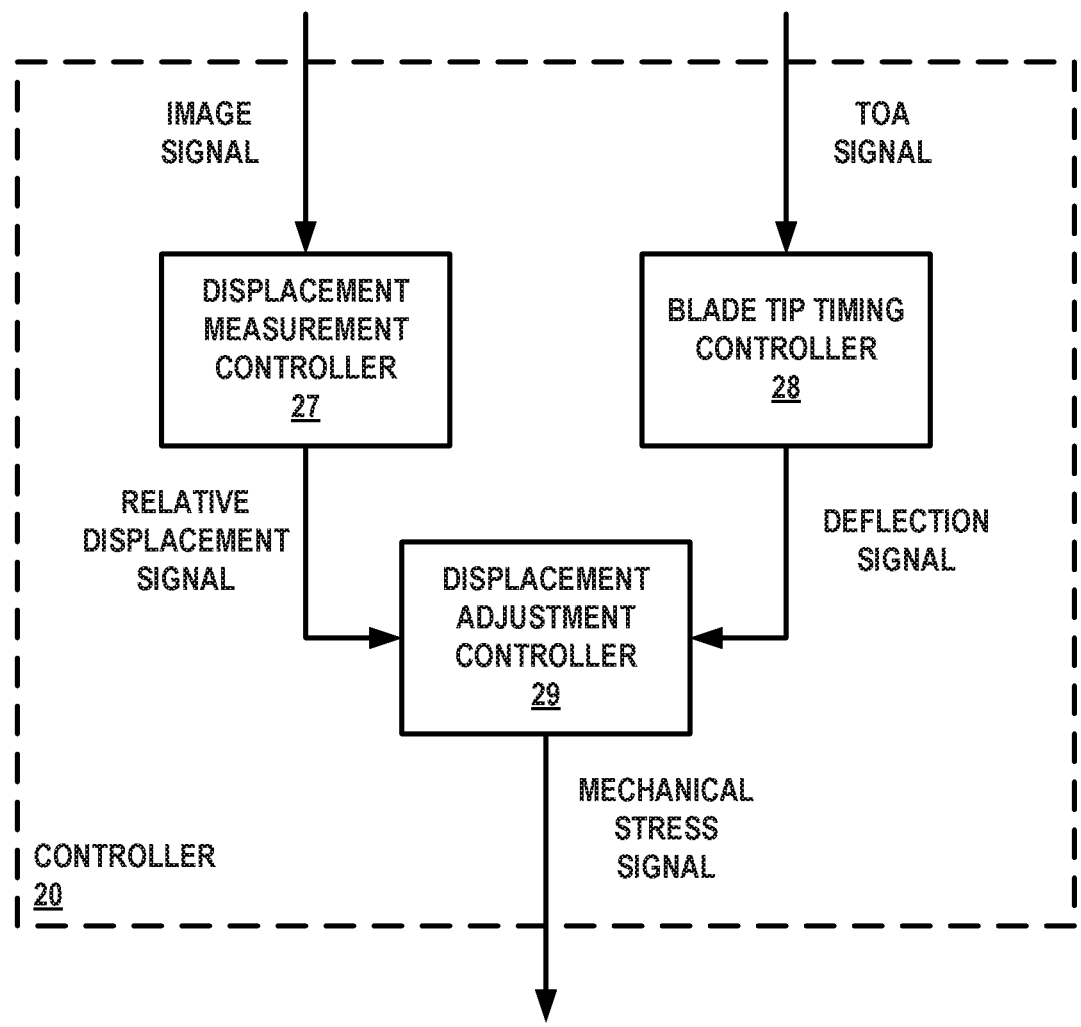
FIG. 2 is a conceptual and schematic block diagram illustrating an example controller for determining a mechanical stress on a turbine blade.

FIG. 2 is a conceptual and schematic block diagram illustrating an example controller for determining a mechanical stress on a turbine blade. In the example of FIG. 2, controller 20 may include a displacement measurement controller 27, a blade tip timing controller 28, and a displacement adjustment controller 29 communicatively coupled to displacement measurement controller 27 and blade tip timing controller 28. However, in other examples, controller 20 may include greater or fewer components. For example, displacement measurement controller 27 may be part of a test controller, while blade tip timing controller 28 and displacement adjustment controller 29 may be part of a real-time controller. As another example, displacement measurement controller 27 and displacement adjustment controller 29 may be part of a displacement controller, while blade tip timing controller 28 may be a legacy controller.

Displacement measurement controller 27 may be configured to receive image signals that include an image of a portion of a turbine blade at a stationary condition and an image of a portion of the turbine blade at a rotational speed and temperature. Displacement measurement controller 27 may be configured to determine a relative displacement of the at least one timing probe 18 from the at least a portion of a turbine blade at the rotational speed and temperature based on the image of a portion of a turbine blade at a stationary condition and the image of a portion of the turbine blade at a rotational speed and temperature, as will be described further in FIG. 3A below. Displacement measurement controller 27 may be configured to output a relative displacement signal that includes the relative displacement of the at least one timing probe 18 from the at least a portion of a turbine blade at the rotational speed and temperature.

Blade tip timing controller 28 may be configured to receive a time of arrival (TOA) signal that includes time-of-arrival information of the turbine blade at the rotational speed and temperature. Blade tip timing controller 28 may be configured to determine a deflection of the turbine blade based on the time-of-arrival information of the turbine blade at the rotational speed and temperature, as will be described further in FIG. 3B below. Blade tip timing controller 28 may be configured to output a deflection signal that includes the deflection of the turbine blade at the rotational speed and temperature.

Displacement adjustment controller 29 may be configured to receive the relative displacement signal from displacement measurement controller 27 and the deflection signal from blade tip timing controller 28. Displacement adjustment controller 29 may be configured to determine a mechanical stress of the turbine blade based on the relative displacement of the at least one timing probe 18 from the at least a portion of a turbine blade at the rotational speed and temperature and the deflection of the turbine blade at the rotational speed and temperature, as will be described further in FIG. 3C. Displacement adjustment controller 29 may be configured to output a mechanical stress signal that includes the mechanical stress of the turbine blade at the rotational speed and temperature.

Further operation of controller 20 will be described in FIGS. 3A-3C below.

System 10 may be used to determine mechanical stresses at an adjusted timing measurement location on a turbine blade using optical measurements. FIG. 3A-3C are flow diagrams illustrating example techniques for determining relative displacement of one or more timing probes from at least a portion of a turbine blade using optical measurements, determining deflection of the turbine blade, and determining a mechanical stress of the turbine blade based on the deflection of the turbine blade and the relative displacement of one or more timing probes from at least a portion of a turbine blade. The techniques of FIGS. 3A-3C will be described with concurrent reference to system 10 of FIG. 1 and controller 20 of FIG. 2, although one of ordinary skill will understand that the techniques of FIG. 3A-3C may be performed by other systems that include more or fewer components, and that system 10 and controller 20 may perform other techniques. For example, one or more control steps performed by controller 20 may be performed manually or by using another component of system 10.

Figure 3A:
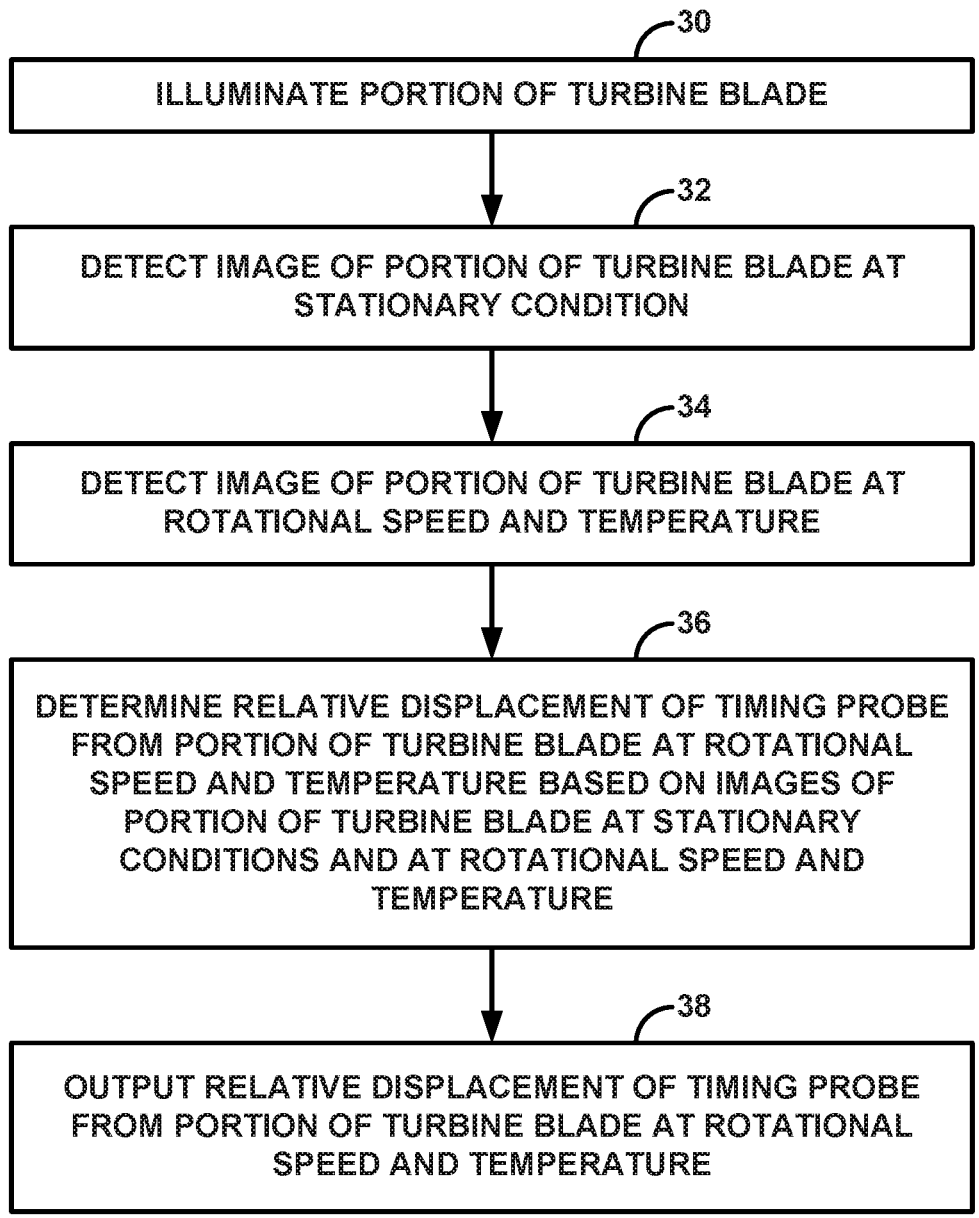
FIG. 3A is a flow diagram illustrating an example technique for determining a relative displacement of a timing probe from a portion of a turbine blade using optical measurements.

FIG. 3A is a flow diagram illustrating an example technique for determining relative displacement of one or more timing probes from at least a portion of a turbine blade using optical measurements. Controller 20 may cause light source 12 to illuminate at least a portion of a turbine blade of the plurality of turbine blades 22 of RMS 26 (30). For example, controller 20 may send an illumination signal to light source 12 to cause light source 12 to illuminate at least a portion of a turbine blade of the plurality of turbine blades 22 at a particular luminosity. In some examples, the at least a portion of the turbine blade may include a radial tip of a leading or trailing edge of the turbine blade.

In some examples, controller 20 may cause light source 12 to illuminate the at least a portion of the turbine blade for a relatively short period of time, such as in a strobing pattern. For example, controller 20 may receive a once-per-revolution signal from a once-per-revolution probe, determine a strobe rate for the at least a portion of the turbine blade based on the once-per-revolution signal, and send an illumination signal to light source 12 that causes light source 12 to illuminate the at least a portion of the turbine blade at the strobe rate. In some examples, light source 12 may be a laser system configured to illuminate the at least a portion of the turbine blade for a period of time less than 100 ns, such as 10 ns. By causing light source 12 to illuminate the at least a portion of the turbine blade for a relatively short period of time, the light reflected by the turbine blade may approximate a still image. In some examples, controller 20 may cause light source 12 to illuminate the at least a portion of the turbine blade at a strobe rate that illuminates more than one turbine blade of the plurality of turbine blades 22. For example, controller 20 may associate an illumination signal for a particular turbine blade with a particular time or other reference. In some examples, controller 20 may cause light source 12 to illuminate the at least a portion of the turbine blade at separate instances as time-of-arrival measurements of the at least one timing probe 18 so as not to interfere with one another with the time-of-arrival measurement. For example, light source 12 may need to be turned off due to interference with an optical time-of-arrival measurement.

Controller 20 may cause camera 16 to detect an image of the at least a portion of the turbine blade at a stationary condition using optical detector 14 (32). For example, controller 20 may send an exposure signal to camera 16 that causes camera 16 to detect the image of the at least a portion of the turbine blade at the stationary condition. The image of the at least a portion of the turbine blade at the stationary condition may represent a state of the turbine blade without dynamic mechanical stress caused by a rotational speed and temperature of RMS 26.

Controller 20 may cause camera 16 to detect an image of the at least a portion of the turbine blade at a rotational speed and temperature using optical detector 14 (34). For example, controller 20 may send an exposure signal to camera 16 that causes camera 16 to detect the image of the at least a portion of the turbine blade at the rotational speed and temperature. The image of the at least a portion of the turbine blade at the dynamic condition may represent a state of the turbine blade with dynamic mechanical and/or thermal stress caused by the rotational speed and temperature of RMS 26. In some examples, controller 20 may synchronize an exposure of camera 16 to the turbine blade at the rotational speed, such that the image of the at least a portion of the turbine blade at the rotational speed and temperature is captured at a consistent rotational position in each revolution. For example, controller 20 may receive a once-per-revolution signal from a once-per-revolution probe, such as probe 54 of FIG. 4, determine an exposure speed of camera 16 based on the once-per-revolution signal, and output an exposure signal to camera 16 that causes camera 16 to capture the image of the at least a portion of the turbine blade at the exposure speed.

Displacement measurement controller 27 of controller 20 may receive the image of the at least a portion of the turbine blade at the stationary condition and the image of the at least a portion of the turbine blade at the rotational speed and temperature from camera 16. In some examples, such as examples that include light source 12 that strobes at a strobe rate, displacement measurement controller 27 may associate the image of the at least a portion of the turbine blade with the particular turbine blade, such as based on the particular time of illumination.

Displacement measurement controller 27 may determine a relative displacement of the at least one timing probe 18 from the at least a portion of the turbine blade at the rotational speed and temperature based on the image of the at least a portion of the turbine blade at the stationary condition and the image of the at least a portion of the turbine blade at the rotational speed and temperature (36). Displacement measurement controller 20 may determine displacement information of optical detector 14 from the at least a portion of the turbine blade based on the image of the at least a portion of the turbine blade at the stationary condition and the image of the at least a portion of the turbine blade at the rotational speed and temperature. The displacement information of optical detector 14 from the at least a portion of the turbine blade may include information related to a change in position, alignment, or any other orientation between the at least a portion of the turbine blade and any one of the at least one timing probe 18, optical detector 14, and the like, at the rotational speed and temperature.

In some examples, displacement information may include an axial displacement of optical detector 14 from the portion of turbine blade 22 at the rotational speed and temperature. The axial displacement of optical detector 14 from the portion of turbine blade 22 may represent a change in a position of optical detector 14 relative to the portion of turbine blade 22 along an axial direction of turbine case 24. Displacement measurement controller 27 may compare a stationary axial position of turbine blade 22 at the stationary condition and a dynamic axial position of turbine blade 22 at the rotational speed and temperature and determine a positional difference between the stationary axial position and the dynamic axial position. For example, displacement measurement controller 27 may determine a stationary axial position of the portion of turbine blade 22 from the image of the portion of turbine blade 22 at stationary conditions. Displacement measurement controller 27 may determine a dynamic axial position of the portion of turbine blade 22 from the image of the portion of turbine blade 22 at dynamic conditions. Displacement measurement controller 27 may determine an axial displacement at the rotational speed and temperature by comparing the stationary axial position and the dynamic axial position and determining a positional difference between the stationary axial position and the dynamic axial position. See, for example, FIGS. 5A and 5B below.

In some examples, displacement information may include deformation displacement of the at least a portion of the turbine blade from the compressor rotor, such as blade tip lean and untwist. Centrifugal and aerodynamic loads acting on the turbine blades under running operating conditions may deform the blade geometry, such as by twisting the turbine blade or leaning the turbine blade. The deformation displacement of the at least a portion of the turbine blade from the compressor rotor may represent a change in deformation of the at least a portion of the turbine blade from the compressor rotor, such as tangential angle perpendicular to the compressor rotor (e.g. blade lean), an axial angle parallel to the compressor rotor (e.g. blade twist or untwist), and any other deviation in alignment of the turbine blade that may be determined from an image of the at least a portion of the turbine blade.

Figure 7:
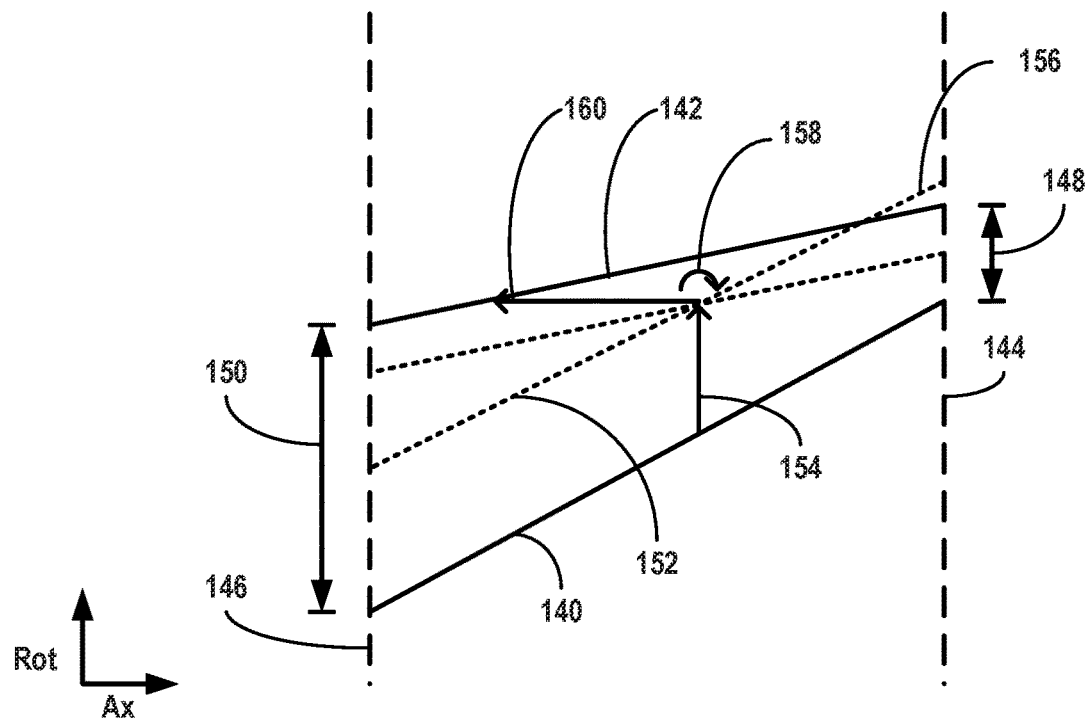
FIG. 7 is a conceptual diagram illustrating blade lean, untwist, and axial shift of a turbine blade.

FIG. 7 is a conceptual diagram illustrating blade lean, untwist, and axial shift of a low RPM turbine blade 140 and a high RPM turbine blade 142. Low RPM turbine blade 140 and high RPM turbine blade 142 each have a trailing edge 144 and a leading edge 146. A difference in trailing edge 144 and leading edge 146 between low RPM turbine blade 140 and high RPM turbine blade 142 may be a static trailing edge displacement 148 and a static leading edge displacement 150. As low RPM turbine blade 140 shifts to high RPM turbine blade, the turbine blade may have a blade lean 154, a blade untwist 158, and an axial shift 160. The blade lean 154 may be indicated by a difference in position between low RPM turbine blade 140 and intermediate 152. The blade untwist 158 may be indicated by a difference in angle and position between intermediate 152 and intermediate 156. The axial shift may be indicated by a difference in position between intermediate 156 and high RPM turbine blade 142.

To capture deformation displacement information, controller 20 may cause camera 16 to capture an approximate still image of the portion of the turbine blade to allow for differentiation of the orientation of the at least a portion of the turbine blade and determine deformation displacement of the at least a portion of the turbine blade from the orientation. For example, an image of the at least a portion of the turbine blade at dynamic conditions and continuous lighting may appear blurred, such that displacement other than along an axial direction may be difficult to determine. As discussed above, controller 20 may cause light source 12 to illuminate the at least a portion of the turbine blade for a short period of time, such that the image of the at least a portion of the turbine blade at the rotational speed and temperature may approximate a still image. In addition to axial displacement, the approximate still image may provide additional information related to a change in orientation of the at least a portion of the turbine blade, such as a displacement of the turbine blade caused by blade lean, a displacement of the turbine blade caused by blade twist or untwist, and other changes in the turbine blade that may be determined from an approximate still image of the at least a portion of the turbine blade.

Displacement measurement controller 27 may compare a stationary alignment of the turbine blade at the stationary condition and a dynamic alignment of the turbine blade at the rotational speed and temperature and determine an alignment difference between the stationary alignment and the dynamic alignment. For example, displacement measurement controller 27 may determine a stationary alignment of the at least a portion of the turbine blade from the image of the at least a portion of the turbine blade at stationary conditions. Displacement measurement controller 27 may determine a dynamic alignment of the at least a portion of the turbine blade from the image of the at least a portion of the turbine blade at dynamic conditions. Displacement measurement controller 27 may determine an alignment displacement at the rotational speed and temperature by comparing the stationary alignment and the dynamic alignment and determining an alignment difference between the stationary alignment and the dynamic alignment. See, for example, FIGS. 5C and 5D below.

In some examples, displacement measurement controller 27 may account for differences in position between optical detector 14 and each of the at least one timing probe 18. The at least one timing probe 18 may be positioned at a different axial position or angle than optical detector 14, such that the displacement of the at least one timing probe 18 from the at least a portion of the turbine blade may be based on the displacement information, as well as the differences in axial position or angle between optical detector 14 and the at least one timing probe 18. In some examples, controller 20 may account for differences in position between the at least a portion of the turbine blade detected by optical detector 14 and the portion of the turbine blade detected by the at least one timing probe 18. Optical detector 14 and timing probe 18 may not monitor the same portion of turbine blade 22, such that the displacement of the at least one timing probe 18 from the at least a portion of the turbine blade may be based on displacement information, as well as the differences in position of the at least a portion of the turbine blade detected by optical detector 14 and the portion of the turbine blade detected by the at least one timing probe 18. For example, optical detector 14 may monitor a leading edge tip of a turbine blade and timing probe 18 may monitor an axial position of the turbine blade just aft of the leading edge tip, such as one third to one half a chord-length aft.

Displacement measurement controller 27 may output the relative displacement of the at least one timing probe 18 from the at least a portion of the turbine blade at the rotational speed and temperature (38). For example, displacement measurement controller 27 may output a displacement signal to displacement adjustment controller 29. In some examples, displacement measurement controller 27 may output the displacement signal to a database, such as a database that associates the relative displacement of the at least one timing probe 18 from the at least a portion of the turbine blade at the rotational speed and temperature with a particular RTS 26 at the particular rotational speed and temperature.

Figure 8:
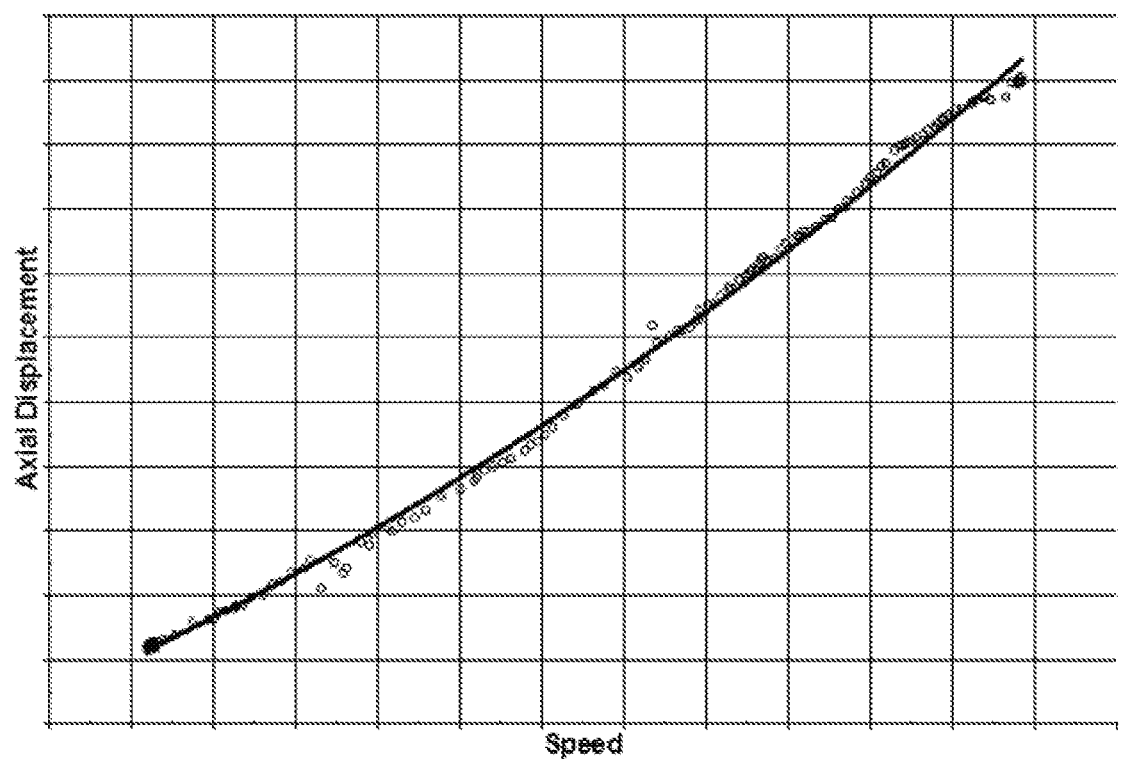
FIG. 8 is an exemplary graph of axial displacement of a turbine blade versus rotational speed.

FIG. 8 is an exemplary graph of relative axial displacement of a turbine blade versus various rotational speeds, illustrated as unitless for purposes of explanation. As seen in FIG. 8, as rotational speed increases, the relative axial displacement of the turbine blade increases. In some examples, the increase in relative axial displacement may be approximately proportional to an increase in rotational speed, such as a linear increase.

Figure 3B:
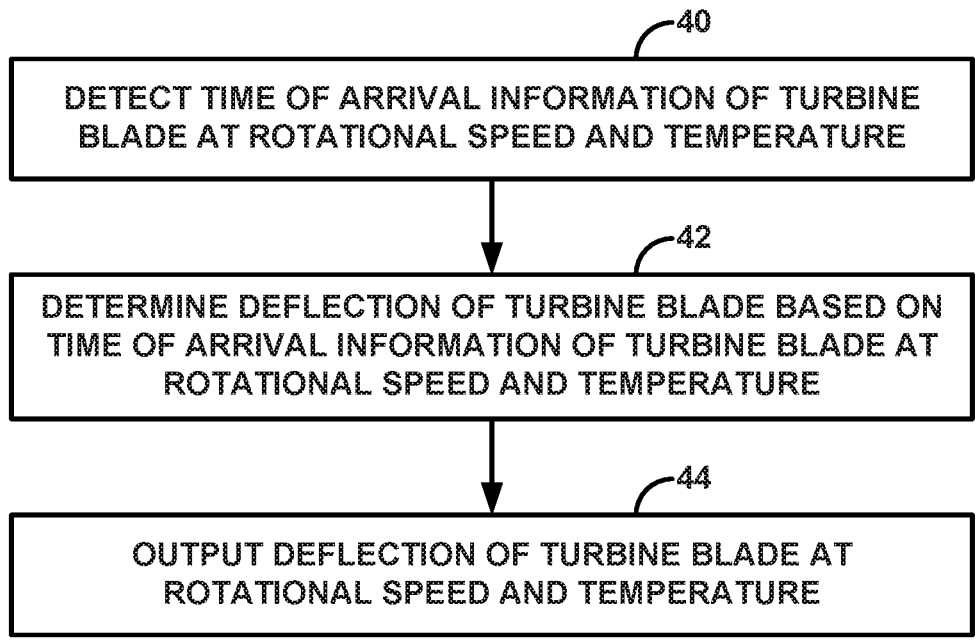
FIG. 3B is a flow diagram illustrating an example technique for determining a deflection of a turbine blade using time of arrival information.

FIG. 3B is a flow diagram illustrating an example technique for determining a deflection of the turbine blade at a rotational speed and temperature. Blade tip timing controller 28 of controller 20 may cause the at least one timing probe 18 to detect time-of-arrival information of the turbine blade at the rotational speed and temperature (40). Time-of-arrival information may include time-of-arrival of the turbine blade detected by the at least one timing probe 18 over a period of time. In some examples, each of the at least one timing probe 18 may continuously send time-of-arrival (TOA) signals to blade tip timing controller 28 that include a detected time-of-arrival of the turbine blade. In examples where the at least one timing probe 18 is an optical sensor, blade tip timing controller 28 may cause the at least one timing probe 18 to emit an optical signal, such as a laser probe signal. The optical signal may intersect the turbine blade at a timing measurement location on the tip of the turbine blade at the rotational speed and temperature. The at least one timing probe 18 may receive the reflected optical signal from the timing measurement location on the tip of the turbine blade. The at least one timing probe 18 may send a TOA signal to blade tip timing controller 28 that represents a time of arrival of the turbine blade for the particular timing probe based on the reflected optical signal.

Figure 9:
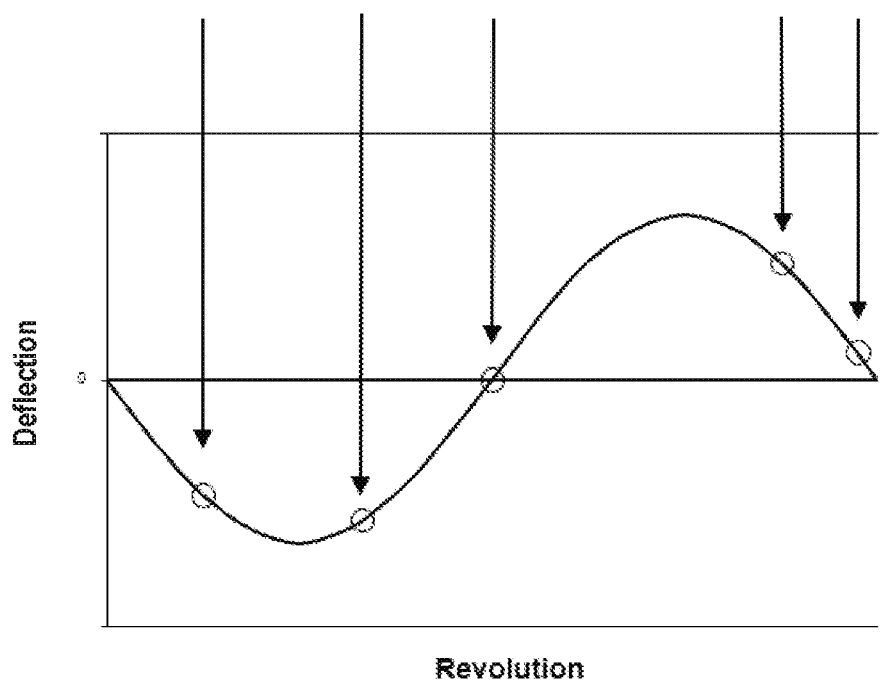
FIG. 9 is an exemplary sinusoidal model of deflection of a turbine blade over a revolution of the turbine blade.

In some examples, the at least one timing probe 18 may include a plurality of timing probes and blade tip timing controller 28 may cause the plurality of timing probes to detect time-of-arrival information of the turbine blade at various rotational speeds and at various points in a vibration of the turbine blade. As a turbine blade rotates, the turbine blade vibrates, such as in a generally sinusoidal pattern. Controller 20 may cause the plurality of timing probes to detect time-of arrival measurements at various points in the cycle of the sinusoid. FIG. 9 is an exemplary diagram of deflection of a turbine blade over a revolution of the turbine blade, illustrated as unitless for explanatory purposes. As seen in FIG. 9, a deflection 170A, 170B, 170C, 170D, 170E may be associated with a time-of-arrival for each timing probe of the at least one timing probe.

Blade tip timing controller 28 may determine a deflection of the turbine blade based on the time-of-arrival information of the turbine blade at the rotational speed and temperature (42). Blade tip timing controller 28 may determine a deflection measurement of the turbine blade at various points in the vibration cycle from the difference between the measured time of arrival and an anticipated time of arrival. For example, blade tip timing controller 28 may multiply the difference between the measured time of arrival and the anticipated time of arrival by the turbine blade tip velocity to determine the deflection of the turbine blade from the expected position and alignment of the turbine blade.

Figure 10:
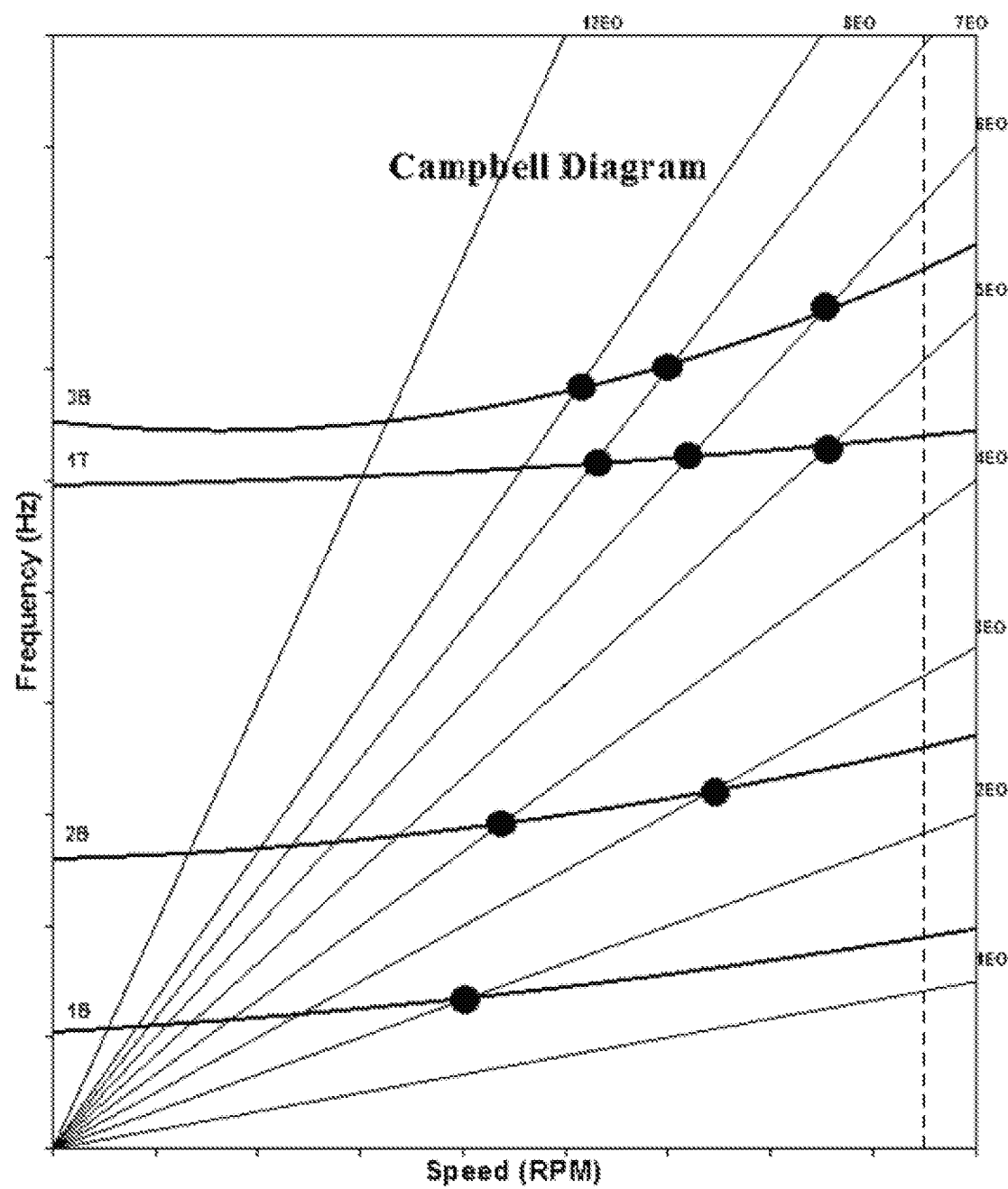
FIG. 10 is an exemplary graph of frequency of turbine blade vibration versus rotational speed for various modes of a turbine blade.

The deflection measurements may be fitted to a sinusoidal model of deflection vs time representing vibration characteristics of the turbine blade at the axial measurement location of the at least one timing probe 18. The fitted sinusoidal model may be used to determine an amplitude, representing a deflection of the turbine blade at the axial measurement location, and a frequency, representing a vibration frequency of the turbine blade at the rotational speed. As seen in FIG. 9, the deflections 170A, 170B, 170C, 170D, 170E may be fitted to a sinusoidal model, such that an amplitude of the sinusoidal model may be associated with a deflection of the turbine blade and the frequency of the sinusoidal model may be associated with a frequency of vibration, such as a particular mode of vibration. For example, FIG. 10 is an exemplary graph of frequency of turbine blade vibration versus rotational speed for various modes of a turbine blade. As seen in FIG. 10, various modes of the turbine blade may be excited at different rotational speeds of the turbine blade.

Blade tip timing controller 28 may output the deflection of the turbine blade at the rotational speed and temperature. For example, blade tip timing controller 28 may output a deflection signal to displacement adjustment controller 29 that includes the deflection of the turbine blade at the rotational speed and temperature.

Figure 3C:
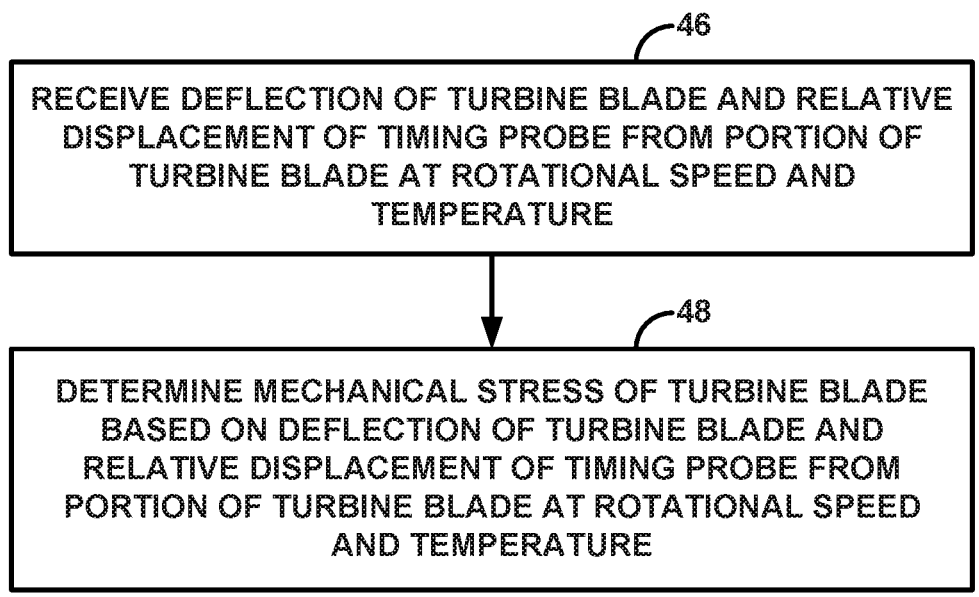
FIG. 3C is a flow diagram illustrating an example technique for determining a mechanical stress of a turbine blade using an adjusted measurement location.

FIG. 3C is a flow diagram illustrating an example technique for determining a mechanical stress of the turbine blade based on the deflection of the turbine blade and the relative displacement of one or more timing probes from at least a portion of a turbine blade. Displacement adjustment controller 29 may receive a relative displacement signal from displacement measurement controller 29 and a deflection signal from blade tip timing controller 28 (46). The relative displacement signal may include a relative displacement of the at least one timing probe 18 from the at least a portion of the turbine blade at the rotational speed and temperature. The deflection signal may include the deflection of the turbine blade at the rotational speed and temperature.

Controller 20 may determine a mechanical stress of the turbine blade based on the deflection of the turbine blade at the rotational speed and temperature and the relative displacement of the at least one timing probe 18 from the portion of the turbine blade at the rotational speed and temperature (48). As the turbine blade rotates at various rotational speeds, deflection of the turbine blade may vary spatially across the turbine blade. Depending on a vibration mode of the turbine blade, a deflection at a particular location may be associated with a different mechanical stress exerted on the turbine blade at the rotational speed.

Figure 6A:
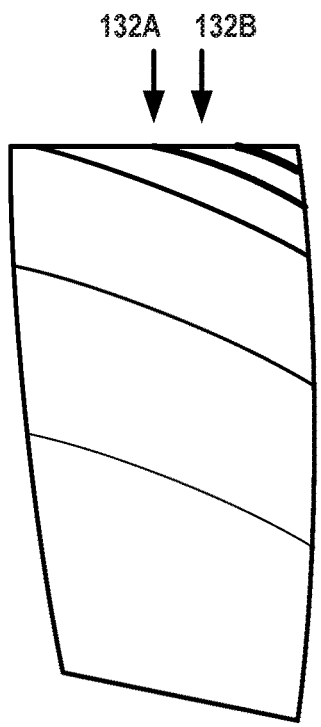
FIG. 6A is a conceptual diagram illustrating deflection distribution of a turbine blade.
Figure 6B:
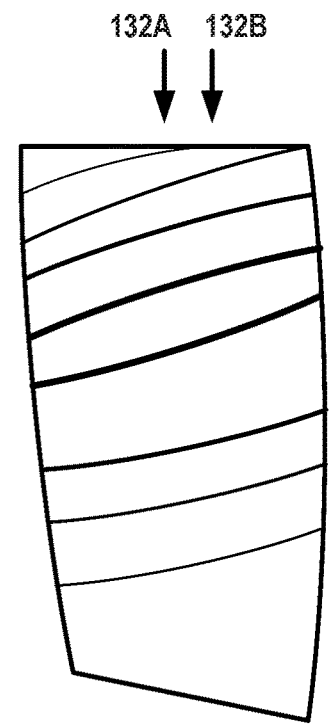
FIG. 6B is a conceptual diagram illustrating deflection-to-stress distribution of a turbine blade.

FIG. 6A is a conceptual diagram illustrating deflection distribution of a turbine blade 130 at a particular mode and rotational speed, where thickness of a line represents a magnitude boundary of deflection. Turbine blade 130 has a first deflection at axial measurement location 132A that is lower than a second deflection at axial measurement location 132B. FIG. 6B is a conceptual diagram illustrating deflection-to-stress ratio distribution of a turbine blade 130 at the particular mode and rotational speed, where thickness of a line represents a magnitude boundary of deflection-to-stress ratio. Different modes may have different mode shapes and different mechanical stress distributions, such that each axial measurement location may have a different deflection-to-stress ratio. Turbine blade 130 has a first deflection-to-stress ratio at axial measurement location 132A that is lower than a second deflection-to-stress ratio at axial measurement location 132B. As can be seen in FIGS. 6A and 6B, a particular measured deflection may be associated with a different mechanical stress depending on the axial measurement location associated with the measured deflection.

Displacement adjustment controller 29 may determine a mechanical stress of the turbine blade based on the deflection of the turbine blade at the rotational speed and temperature at an axial measurement location adjusted for the relative displacement of the at least one timing probe 18 from the portion of the turbine blade at the rotational speed and temperature. In some examples, displacement adjustment controller 29 may determine an adjusted axial measurement location for the deflection of the turbine blade at the rotational speed and temperature. Displacement adjustment controller 29 may calculate the adjusted axial measurement location from an axial measurement location at stationary conditions and the relative displacement of the at least one timing probe 18 from the portion of the turbine blade at the rotational speed and temperature.

In some examples, displacement adjustment controller 29 may determine the mechanical stress of the turbine blade using finite element models of the turbine blade. In some examples, displacement adjustment controller 29 may include finite element models of the turbine blade at various vibration modes and rotational speeds. The finite element models may simulate mechanical stresses on the turbine blade at different rotational speeds and vibration modes and include correlations between deflection at a particular axial measurement location and a mechanical stress on the turbine blade. Displacement adjustment controller 29 may determine a vibration mode based on the frequency of the turbine blade, select the finite element model based on the vibration mode, and execute the finite element models based on the adjusted axial measurement location to determine mechanical stresses that result in the observed deflections of the turbine blade at the adjusted axial measurement location.

In some examples, the finite element models may include tables of correlations between deflection and a mechanical stress on the turbine blade at various axial measurement locations. Displacement adjustment controller 29 may use any of frequency of the turbine blade, vibration mode of the turbine blade, adjusted axial measurement location, rotational speed of the turbine blade, and deflection of the turbine blade, to determine mechanical stress of the turbine blade using deflection-to-stress ratios of the finite element models. As an example, displacement adjustment controller 29 may select a table based on the adjusted axial measurement location, determine a vibration mode of the turbine blade based on the frequency of the turbine blade, look up a deflection-to-stress value based on the vibration mode and rotational speed, and determine the mechanical stress based on the deflection and deflection-to-stress value. As another example, displacement adjustment controller 29 may determine a vibration mode of the turbine blade based on the frequency and rotational speed of the turbine blade, select a table based on the vibration mode of the turbine blade, look up a deflection-to-stress ratio value based on the adjusted axial measurement location, and determine the mechanical stress based on the deflection and deflection-to-stress value.

Figures 11A, 11B:
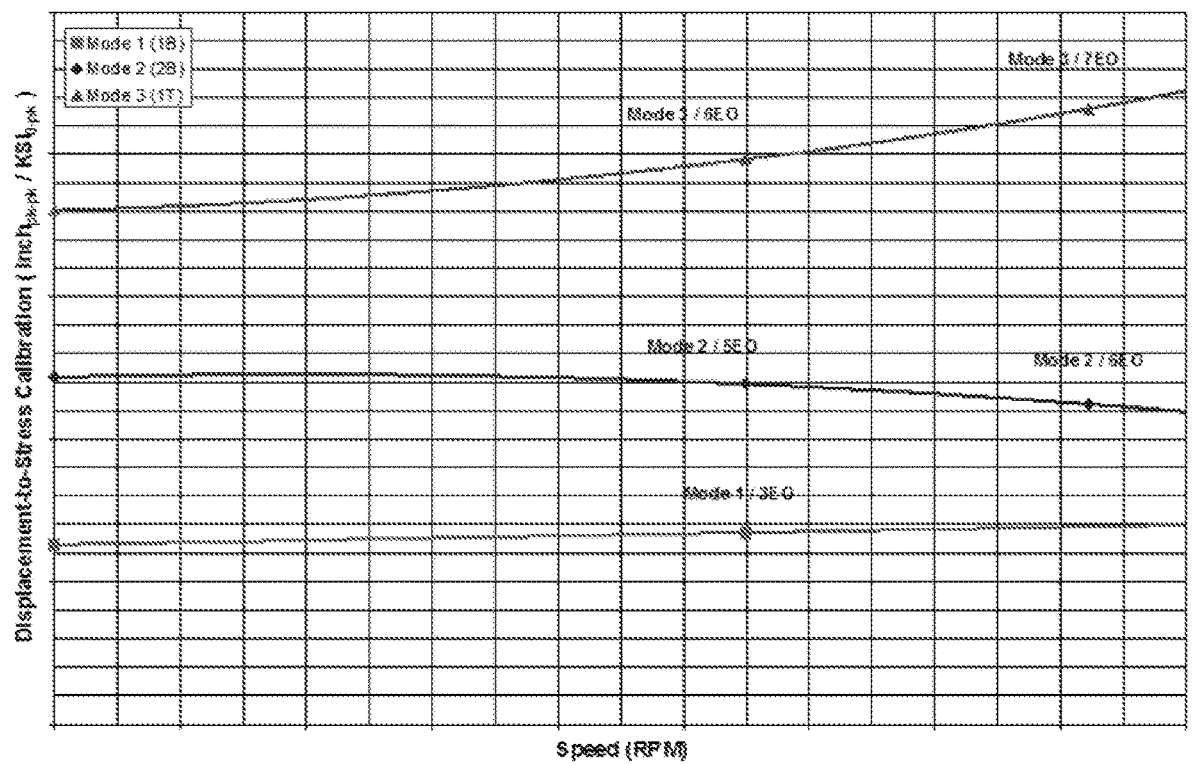
FIG. 11A is an exemplary graph of displacement-to-stress ratio versus rotational speed for various modes of a turbine blade.
FIG. 11B is an exemplary table of displacement-to-stress ratio versus axial displacement for a particular mode of a turbine blade.

For example, FIG. 11A is an exemplary graph of displacement-to-stress ratio versus rotational speed for various modes of a turbine blade at an axial measurement location on the turbine blade, wherein the displacement-to-stress ratio represents the deflection-to-stress value of the turbine blade. As seen in FIG. 11A, for the particular axial measurement location on the turbine blade, a particular deflection at a particular rotational speed may be associated a different displacement-to-stress ratio depending on the mode of the turbine blade. FIG. 11B is an exemplary table of displacement-to-stress ratio versus axial displacement for a particular mode of a turbine blade. For the mode of the turbine blade, the adjusted axial measurement location may be used to select a deflection-to-stress ratio.

Displacement adjustment controller 29 may output the mechanical stress of the turbine blade at the rotational speed and temperature. For example, displacement adjustment controller 29 may output a stress signal that includes the mechanical stress of the turbine blade at the rotational speed and temperature.

In some examples, controller 20 may use displacement information to validate determinations of the mechanical stress of the turbine blade based on the deflections of the turbine blade. For example, as described above, displacement information may include alignment information related to deflections of the turbine blade, such as blade lean and twist. Controller 20 may use displacement information to determine deflections of the turbine blade. Controller 20 may compare the deflections of the turbine blade determined using the finite element model to deflections of the turbine blade determined from the displacement information to determine a difference. Controller 20 may use the difference to update the finite element model predictions and reduce the difference.

Controller 20 may repeat any of the techniques of FIGS. 3A-3C for a variety of rotational speeds, temperatures, or both, and in a variety of sequences. In some examples, controller 20 may periodically perform steps 30-38 and continuously perform steps 40-42 during operation of RMS 26. For example, controller 20 may perform steps 30-38 as part of displacement testing to determine or update relative displacement information for the rotational speed and temperature. Controller 20 may store the relative displacement information associated with the rotational speed and temperature at which the relative displacement information was determined. Controller 20 may perform steps 40 and 42 as part of deflection testing during operation of RMS 26 by using the stored displacement information to determine mechanical stresses of the turbine blade. Controller 20 may update the relative displacement information for the rotational speed and temperature periodically or as needed.

Figure 4:
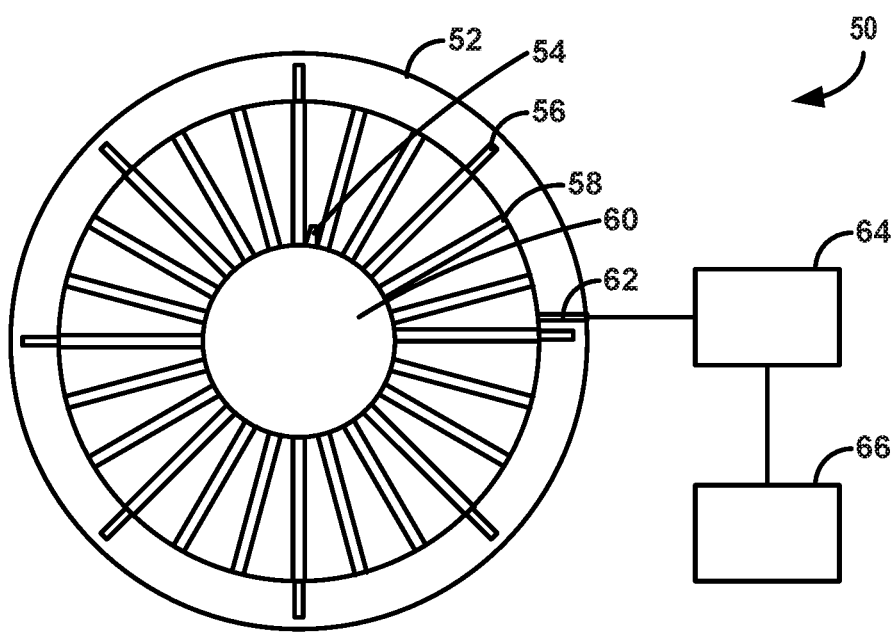
FIG. 4 is a conceptual diagram illustrating an example engine that includes circumferentially distributed instrumentation.

The system of FIG. 1 may be used for a variety of rotary mechanical systems, including turbines. FIG. 4 is a conceptual diagram illustrating an example turbine 50 that includes circumferentially distributed instrumentation. Components of turbine 50 may correspond to components of RMS 26 of FIG. 1. Turbine 50 includes a turbine case 52, a rotor 60, and a plurality of turbine blades 58 extending from rotor 60. Turbine case 52 includes instrumentation that includes at least one timing probe 56, an optical detector 62, and a light (not shown) coupled to turbine case 52, while rotor 60 includes instrumentation that includes a once per revolution probe 54 coupled to rotor 60. Any of the instrumentation of turbine case 52 and rotor 60 may be communicatively coupled to a controller 66. Optical detector 62 may be optically coupled to camera 64. Camera 64 and controller 66 may be physically removed from turbine case 52.

As described in FIG. 3A, optical images may be used to determine relative displacement information. FIGS. 5A-5D are conceptual diagrams illustrating overlaid images from an optical detector of displacement of at least a portion of a turbine blade at various conditions. In the examples of FIGS. 5A-5D, the illustrated overlaid images may be images of the at least a portion of a turbine blade of a plurality of turbine blades 22 detected by camera 16 using optical detector 14, such as the images captured in steps 32 and 34 of FIG. 3A described above.

Figure 5A:
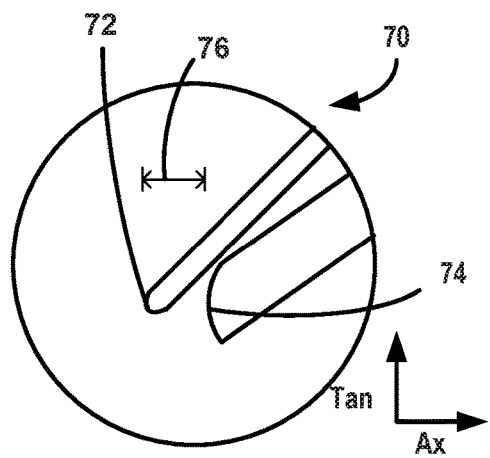
FIG. 5A is a conceptual diagram illustrating an overlaid image of a turbine blade detected by an optical detector at a stationary condition and a dynamic condition at 15,000 RPM using a continuous light source.

FIG. 5A is a conceptual diagram illustrating an overlaid image 70 of a turbine blade detected by an optical detector at a stationary condition and a dynamic condition at 15,000 RPM using a continuous light source. At the stationary condition, the trailing edge of the turbine blade is at a stationary axial position 72. At the dynamic condition of 15,000 RPM, the trailing edge of the turbine blade is at a dynamic axial position 74. As seen in FIG. 5A, at the dynamic condition, the image of the turbine blade may appear blurred due to the speed of the turbine blade at 15,000 RPM. However, the trailing edge of the turbine blade at the dynamic condition may still be identified at the dynamic axial position 74, as the rotational direction of the turbine blade is perpendicular to the axial direction. The stationary axial position 72 and the dynamic axial position 74 may have an axial difference 76. The axial difference 76 may represent displacement between the optical detector and the tip of the turbine blade at 15,000 RPM.

Figure 5B:
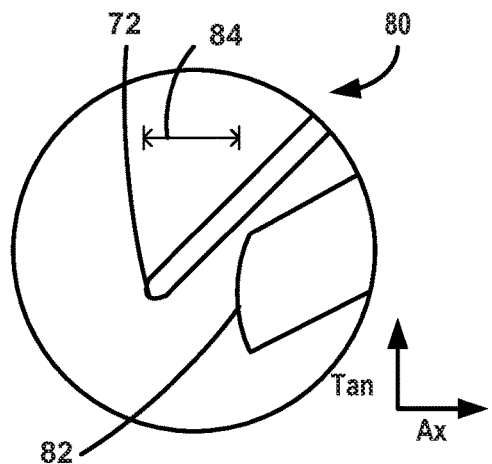
FIG. 5B is a conceptual diagram illustrating an overlaid image of a turbine blade detected by an optical detector at a stationary condition and a dynamic condition at 30,000 RPM using a continuous light source.

FIG. 5B is a conceptual diagram illustrating an overlaid image 80 of a turbine blade detected by an optical detector at a stationary condition and a dynamic condition at 30,000 RPM using a continuous light source. At the dynamic condition of 30,000 RPM, the trailing edge of the turbine blade is at a dynamic axial position 82. As seen in FIG. 5B, at the dynamic condition, the image of the turbine blade at 30,000 RPM may appear more blurred than the image of the turbine blade at 15,000 RPM due to the higher speed of the turbine blade at 30,000 RPM. The stationary axial position 72 and the dynamic axial position 82 may have an axial difference 84. The axial difference 84 at 30,000 RPM may be greater than the axial difference 76 at 15,000 RPM, as higher operating speeds and/or higher temperatures may correspond to greater axial displacement of the optical detector from the turbine blade.

Figure 5C:
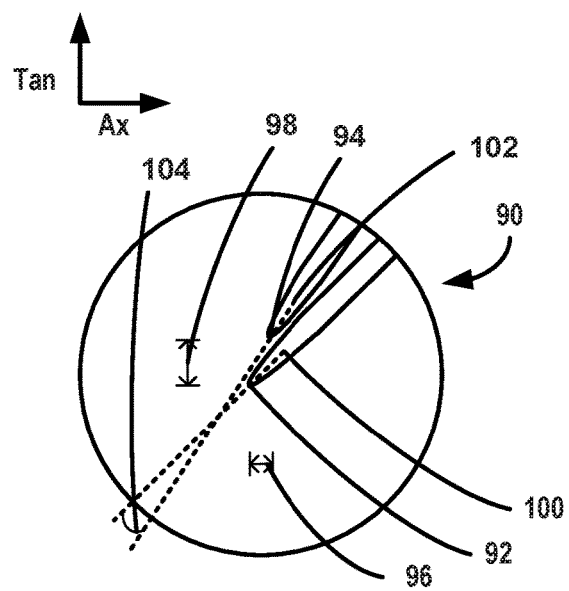
FIG. 5C is a conceptual diagram illustrating an overlaid still image of a turbine blade detected by an optical detector at a stationary condition and a dynamic condition at 15,000 RPM using a pulsating light source.

FIG. 5C is a conceptual diagram illustrating an overlaid still image 90 of a turbine blade detected by an optical detector at a stationary condition and a dynamic condition at 15,000 RPM using a pulsating light source. At the stationary condition, the trailing edge of the turbine blade is at a stationary position 92 having a stationary alignment 100. At the dynamic condition of 15,000 RPM, the trailing edge of the turbine blade is at a dynamic position 94 having a dynamic alignment 102. As seen in FIG. 5C, at the dynamic condition, the image of the turbine blade may appear still due to the strobing light, such that orientation of the turbine blade may be determined. The stationary position 92 and the dynamic position 74 may have an axial difference 96 and a tangential difference 98 perpendicular to the axis of the rotor. The axial difference 96 may represent displacement between the optical detector and the tip of the turbine blade at 15,000 RPM, as well as some axial displacement caused by twisting of the turbine blade. The tangential difference 98 may represent tangential displacement of the turbine blade, such as in a direction opposite the rotational direction, due to forces on the turbine blade caused by rotation. The tangential displacement, while represented as a difference in position along the rotational direction, may also be represented as an angular difference between an alignment of the turbine blade from the rotor at a stationary condition and an alignment of the turbine blade from the rotor at a dynamic condition. The stationary alignment 100 and dynamic alignment 102 may have an angular difference 104 parallel to the axis of the rotor. The angular difference 106 may represent axial angular displacement of the turbine blade, such as in a twisting motion along a plane perpendicular to the rotational direction, due to forces on the turbine blade caused by rotation.

Figure 5D:
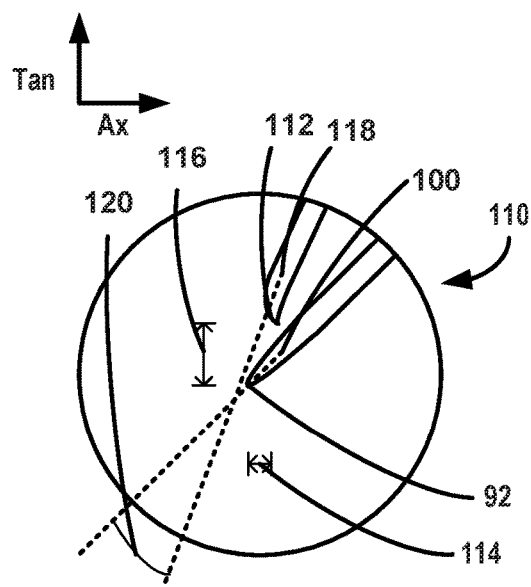
FIG. 5D is a conceptual diagram illustrating an overlaid still image of a turbine blade detected by an optical detector at a stationary condition and a dynamic condition at 30,000 RPM using a pulsating light source.

FIG. 5D is a conceptual diagram illustrating an overlaid still image 110 of a turbine blade detected by an optical detector at a stationary condition and a dynamic condition at 30,000 RPM using a pulsating light source. At the dynamic condition of 30,000 RPM, the trailing edge of the turbine blade is at a dynamic position 112 having a dynamic alignment 118. The stationary position 92 and the dynamic position 112 may have an axial difference 114 and a tangential difference 116 perpendicular to the axis of the rotor. As seen in FIG. 5D, both the axial displacement 114 and the tangential difference 116 of the turbine blade at 30,000 RPM may be greater than the axial displacement 96 and the tangential displacement 98 of the turbine blade at 15,000 RPM, as higher operating speeds and/or higher temperatures may correspond to greater axial displacement of the optical detector from the turbine blade and greater tangential displacement of the turbine blade from the rotor. The stationary alignment 100 and dynamic alignment 118 may have an angular difference 120 parallel to the axis of the rotor. As seen in FIG. 5D, the angular difference 120 of the turbine blade at 30,000 RPM may be greater than the angular difference 104 of the turbine blade at 15,000 RPM, as higher operating speeds and/or higher temperatures may correspond to greater twisting of the turbine blade.

Various examples have been described. These and other examples are within the scope of the following claims.

What is claimed is:

1. A method, comprising:
    illuminating, using a light source, at least a portion of a turbine blade of an engine;
    detecting, by a camera and using an optical detector, an image of the at least a portion of the turbine blade at a stationary condition, wherein the optical detector is coupled to a turbine case of the engine;
    detecting, by the camera and using the optical detector, an image of the at least a portion of the turbine blade at a rotational speed and temperature;
    determining, by a controller, a relative displacement of at least one timing probe from the at least a portion of the turbine blade at the rotational speed and temperature based on the image of the at least a portion of the turbine blade at the stationary condition and the image of the at least a portion of the turbine blade at the rotational speed and temperature, wherein the at least one timing probe is coupled to the turbine case; and
    outputting, by the controller, the relative displacement of the at least one timing probe from the at least a portion of the turbine blade at the rotational speed and temperature.

2. The method of claim 1, further comprising determining, by the controller, a mechanical stress of the turbine blade based on a deflection of the turbine blade and the relative displacement of the at least one timing probe from the at least a portion of the turbine blade at the rotational speed and temperature.

3. The method of claim 2, further comprising:
    detecting, by the at least one timing probe, time of arrival information of the turbine blade at the rotational speed and temperature; and
    determining, by the controller, the deflection of the turbine blade based on the time of arrival information of the turbine blade at the rotational speed and temperature.

4. The method of claim 1, wherein the relative displacement of the at least one timing probe from the at least a portion of the turbine blade at the rotational speed and temperature includes at least one of an axial displacement, a tangential displacement, and an angular displacement.

5. The method of claim 1, wherein detecting the image of the at least a portion of the turbine blade at the rotational speed and temperature comprises synchronizing, by the controller, an exposure of the camera to rotation of the turbine blade at the rotational speed.

6. The method of claim 1, wherein detecting the image of the at least a portion of the turbine blade at the rotational speed and temperature comprises synchronizing, by the controller, the illumination of the at least a portion of the turbine blade to the rotational speed.

7. The method of claim 6, wherein the light source comprises a laser system.

8. The method of claim 1, wherein the rotational speed and temperature is a first rotational speed and temperature, the relative displacement is a first relative displacement, and wherein the method further comprises:
   detecting, by the camera and using the optical detector, an image of the at least a portion of the turbine blade at a second rotational speed and temperature;
   determining, by the controller, a second relative displacement of the at least one timing probe from the at least a portion of the turbine blade at the second rotational speed and temperature based on the image of the at least a portion of the turbine blade at the stationary condition and the image of the at least a portion of the turbine blade at the second rotational speed and temperature; and
   outputting, by the controller, the second relative displacement of the at least one timing probe from the at least a portion of the turbine blade at the second rotational speed and temperature.

9. The method of claim 1, wherein the optical detector is a borescope.

10. A system, comprising:
   a light source configured to illuminate at least a portion of a turbine blade of an engine;
   an optical detector coupled to a turbine case of the engine;
   a camera communicatively coupled to the optical detector and configured to:
      detect, using the optical detector, an image of the at least a portion of the turbine blade at a stationary condition; and
      detect, using the optical detector, an image of the at least a portion of the turbine blade at a rotational speed and temperature; and
   a controller configured to:
      determine a relative displacement of at least one timing probe from the at least a portion of the turbine blade at the rotational speed and temperature based on the image of the at least a portion of the turbine blade at the stationary condition and the image of the at least a portion of the turbine blade at the rotational speed and temperature, wherein the at least one timing probe is coupled to the turbine case; and
      output the relative displacement of the at least one timing probe from the at least a portion of the turbine blade at the rotational speed and temperature.

11. The system of claim 10, wherein the controller is further configured to determine a mechanical stress of the turbine blade based on a deflection of the turbine blade and the relative displacement of the at least one timing probe from the at least a portion of the turbine blade at the rotational speed and temperature.

12. The system of claim 11, wherein the system further comprises the at least one timing probe configured to detect time of arrival information of the turbine blade at the rotational speed and temperature, and wherein the controller is further configured to determine a mechanical stress of the turbine blade based on the deflection of the turbine blade and the relative displacement of the at least one timing probe from the at least a portion of the turbine blade at the rotational speed and temperature.

13. The system of claim 10, wherein the relative displacement of the at least one timing probe from the at least a portion of the turbine blade at the rotational speed and temperature includes at least one of an axial displacement, tangential displacement, and angular displacement.

14. The system of claim 10, wherein the controller is configured to synchronize an exposure of the camera to rotation of the turbine blade at the rotational speed.

15. The system of claim 10, wherein the controller is configured to synchronize the illumination of the at least a portion of the turbine blade to the rotational speed.

16. The system of claim 15, wherein the light source comprises a laser system.

17. The system of claim 10, wherein the optical detector comprises a borescope.

18. The system of claim 10, wherein the rotational speed and temperature is a first rotational speed and temperature, the relative displacement is a first relative displacement, and wherein:
   the camera is further configured to detect, using the optical detector, an image of the at least a portion of the turbine blade at a second rotational speed and temperature; and
   the controller is further configured to:
      determine a second relative displacement of the at least one timing probe from the at least a portion of the turbine blade at the second rotational speed and temperature based on the image of the at least a portion of the turbine blade at the stationary condition and the image of the at least a portion of the turbine blade at the second rotational speed and temperature; and
      output the second relative displacement of the at least one timing probe from the at least a portion of the turbine blade at the second rotational speed and temperature.

19. A controller configured to:
   output, to a light source, an illumination signal to cause the light source to illuminate a portion of a turbine blade of an engine;
   output, to a camera, an exposure signal to cause the camera to:
      detect, using an optical detector, an image of the portion of the turbine blade at a stationary condition, wherein the optical detector is coupled to a turbine case; and
      detect, using the optical detector, an image of the portion of the turbine blade at a rotational speed and temperature;
   receive, from the camera, an image signal that includes the image of the portion of the turbine blade at the stationary condition and the image of the portion of the turbine blade at the rotational speed and temperature;
   determine a relative displacement of the at least one timing probe from the at least a portion of the turbine blade at the rotational speed and temperature based on the image of the at least a portion of the turbine blade at the stationary condition and the image of the at least a portion of the turbine blade at the rotational speed and temperature; and
   output the relative displacement of the at least one timing probe from the at least a portion of the turbine blade at the rotational speed and temperature.

20. The controller of claim 19, further configured to determine a mechanical stress of the turbine blade based on a deflection of the turbine blade and the relative displacement of the at least one timing probe from the at least a portion of the turbine blade at the rotational speed and temperature.

* * * * *